United States Patent
Ohkuma

(10) Patent No.: US 10,127,200 B2
(45) Date of Patent: Nov. 13, 2018

(54) INFORMATION PROCESSING APPARATUS, INFORMATION PROCESSING METHOD AND INFORMATION PROCESSING SYSTEM FOR CONVERTING DISPLAY ELEMENTS OF A WEB PAGE FOR USE WITH FUNCTIONS OF AN INFORMATION PROCESSING APPARATUS

(71) Applicant: Hideharu Ohkuma, Tokyo (JP)

(72) Inventor: Hideharu Ohkuma, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 535 days.

(21) Appl. No.: 14/645,634

(22) Filed: Mar. 12, 2015

(65) Prior Publication Data

US 2015/0261734 A1    Sep. 17, 2015

(30) Foreign Application Priority Data

Mar. 17, 2014    (JP) .................................. 2014-053940

(51) Int. Cl.
  *G06F 17/22*    (2006.01)
  *G06F 17/30*    (2006.01)
(52) U.S. Cl.
  CPC ........ *G06F 17/2247* (2013.01); *G06F 17/227* (2013.01); *G06F 17/30905* (2013.01)
(58) Field of Classification Search
  None
  See application file for complete search history.

(56) References Cited

U.S. PATENT DOCUMENTS

| 2002/0135800 A1* | 9/2002 | Dutta ................... G06F 3/1219 358/1.15 |
| 2009/0310170 A1 | 12/2009 | Murakami et al. |
| 2010/0083163 A1* | 4/2010 | Maghoul .............. G06F 1/1626 715/781 |

(Continued)

FOREIGN PATENT DOCUMENTS

| JP | 2003-271508 | 9/2003 |
| JP | 2008-251004 | 10/2008 |

(Continued)

OTHER PUBLICATIONS

Japanese Office Action dated Jan. 23, 2018 for corresponding Japanese Patent Application No. 2014-053940.

*Primary Examiner* — Wilson W Tsui
*Assistant Examiner* — Sanchita Roy
(74) *Attorney, Agent, or Firm* — Harness, Dickey & Pierce, P.L.C.

(57) ABSTRACT

An information processing apparatus displays a web page received from the outside based on one or more display elements included in the web page. The information processing apparatus converts, according to a predetermined conversion rule, a to-be-converted display element included in the one or more display elements of the web page, when receiving the web page from the outside; displays the web page based on the display elements of the web page when the display elements of the web page do not include the one or more to-be-converted display elements, and displays a web page after conversion based on the one or more converted display elements acquired from converting the one or more to-be-converted display elements when the web page includes the one or more to-be-converted display elements.

17 Claims, 15 Drawing Sheets

(56) References Cited

U.S. PATENT DOCUMENTS

| | | | |
|---|---|---|---|
| 2012/0220263 A1* | 8/2012 | Smith | H04W 4/003 455/410 |
| 2013/0107288 A1* | 5/2013 | Gu | G06K 15/1807 358/1.6 |
| 2014/0281884 A1* | 9/2014 | Burckart | G06F 17/30893 715/234 |
| 2015/0012473 A1* | 1/2015 | Christensen | G06F 17/3089 706/47 |

FOREIGN PATENT DOCUMENTS

| | | |
|---|---|---|
| JP | 2009-302769 A | 12/2009 |
| JP | 2010-277120 A | 12/2010 |

* cited by examiner

| CONVERSION TARGET ELEMENT | CONVERSION PROCESS CONTENTS |
|---|---|
| "class" ATTRIBUTE OF "form" IS SET AS "scanForm" | GENERATE SCAN SETTING FORM IN "form" ELEMENT |

FIG.7B

```
<form id="scanForm" class="scanForm" />
<input type="hidden" name="scanColor" value="color" />
<input type="hidden" name="fileFormat" value="pdf" />
<input type="hidden" name="originalSide" value="top_to_top" />
<!-- OTHER SCANNER SETTINGS
<ul>
<li><button onclick="displayColorForm()">Monochrome</button></li>
<li><button onclick="displayFileFormatForm()">PDF 200 dpi</button></li>
. . .
```

FIG.9A

```
<html>
<head>
  .  .  .
</head>
<body>
<h1>
  .  .  .
<div>
<form id="uploadForm" class="uploadForm">
<fieldset>
<label for="title">FILE NAME<input type="text" name="title" value="" />
<label for="doc"><input type="file" name="doc" />
</fieldset>
<p>
<input type="submit" />
</p>
</form>
```

81

8

.  .  .

```
<html>
<head>
...
</head>
<body>
<h1>
...
<div>
    <form id="uploadForm" class="uploadForm">
        <fieldset>
        <label for="title">FILE NAME<input type="text" name="title" value="" />
        <label for="doc "><scan:input type="file" name="doc" />
                                    ~11
        </fieldset>
        <p>
        <input type="submit" />
        </p>
    </form>
...
```

| CONVERSION TARGET ELEMENT | CONVERSION PROCESS CONTENTS |
|---|---|
| "type" OF "input" ELEMENT IS SET AS "file" | CONVERT "input" INTO EXTENDED TAG "scan:input" |

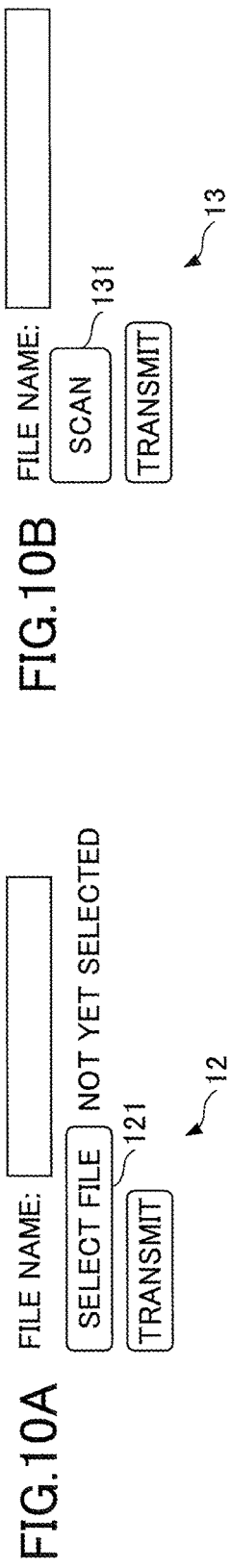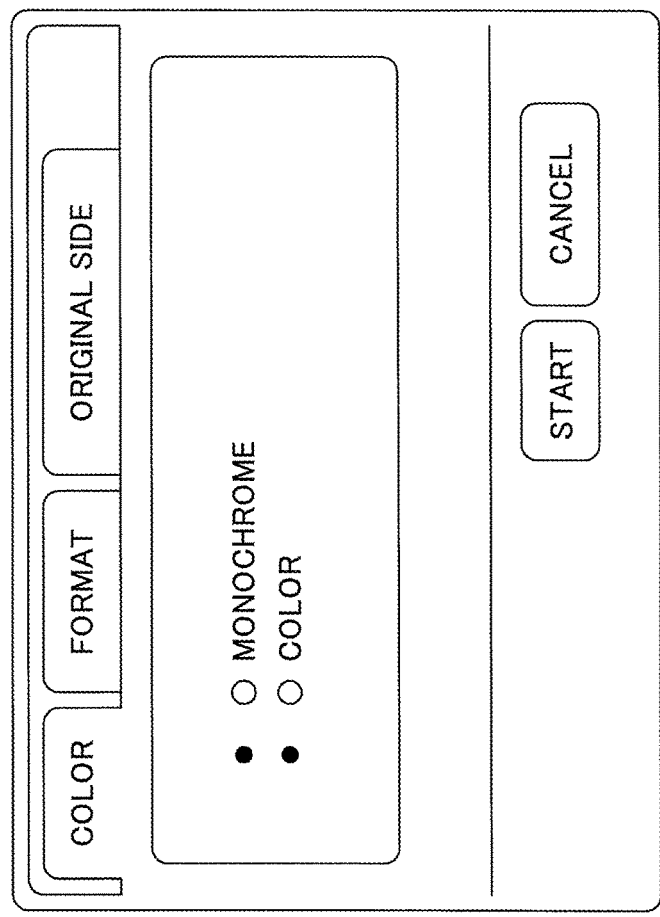
FIG.10A FIG.10B FIG.10C

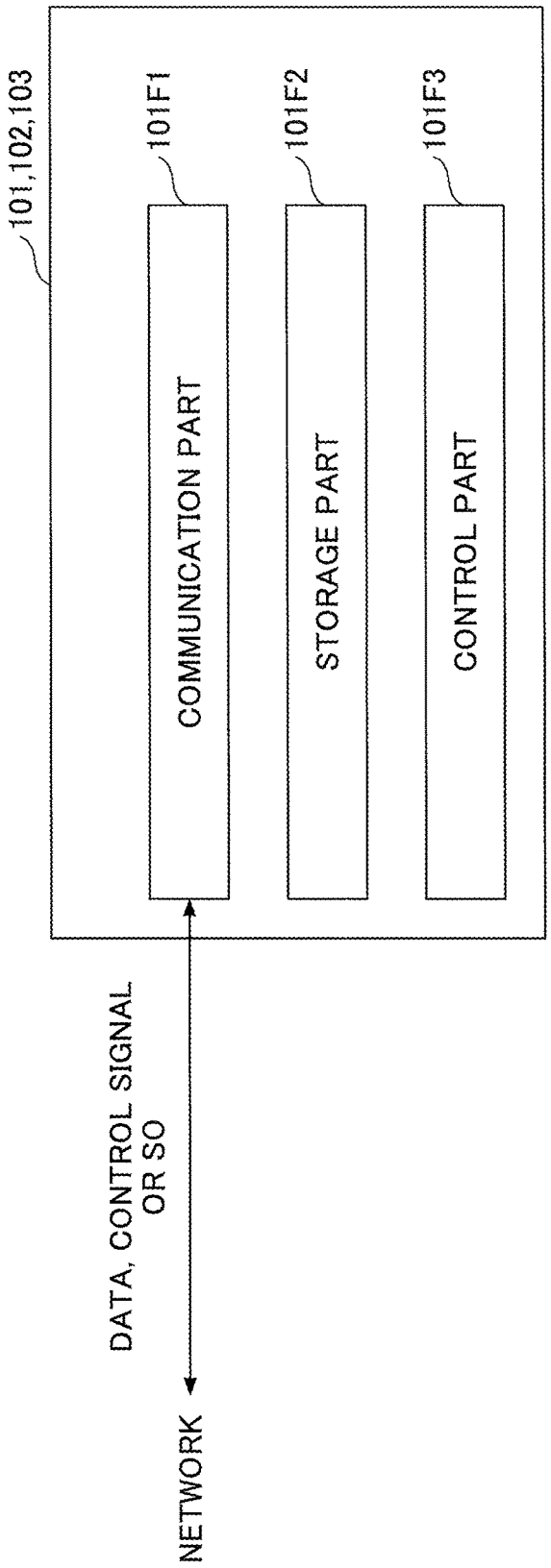

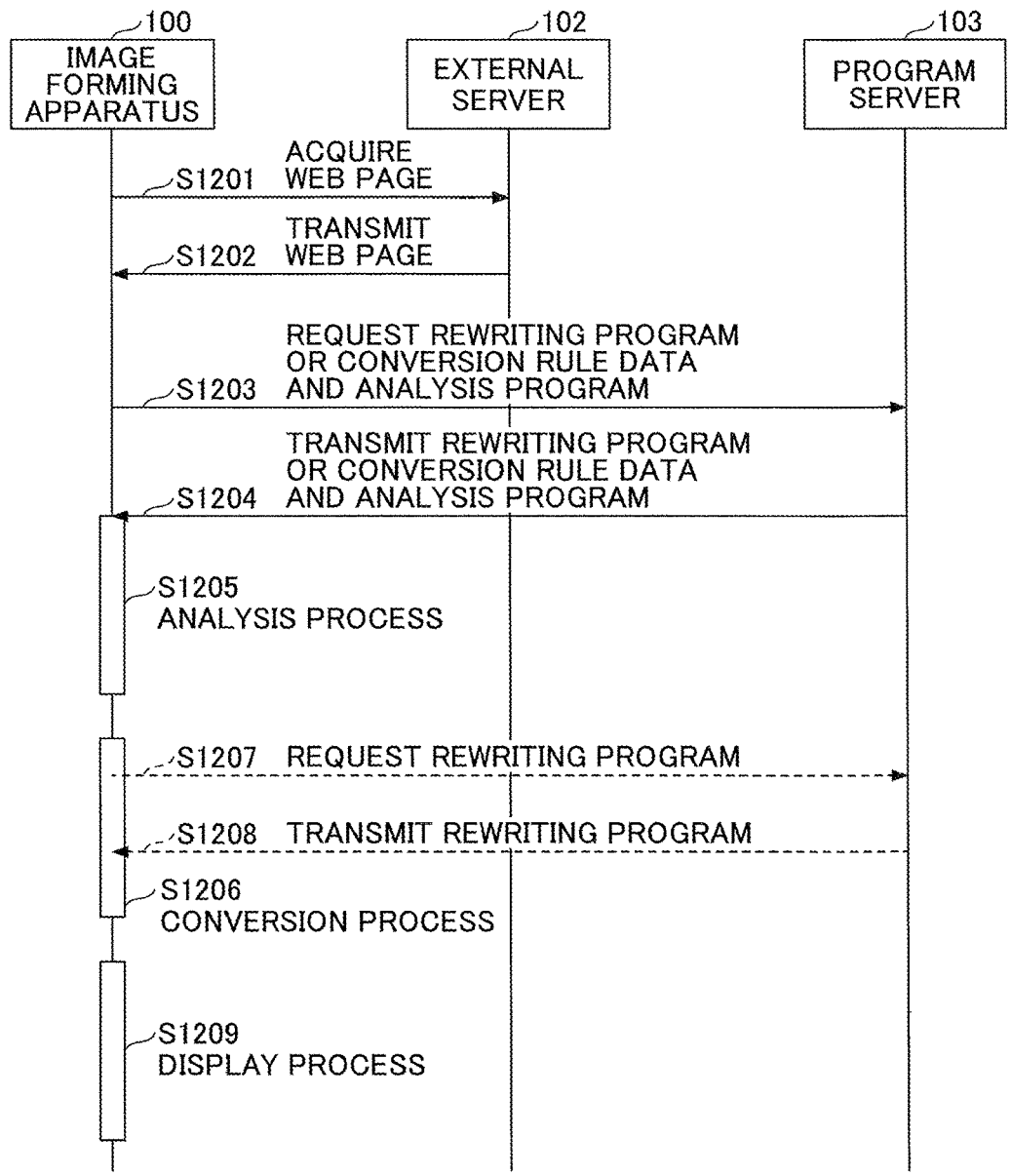

INFORMATION PROCESSING APPARATUS, INFORMATION PROCESSING METHOD AND INFORMATION PROCESSING SYSTEM FOR CONVERTING DISPLAY ELEMENTS OF A WEB PAGE FOR USE WITH FUNCTIONS OF AN INFORMATION PROCESSING APPARATUS

BACKGROUND OF THE INVENTION

1. Field of the Invention

The present invention relates to an information processing apparatus, an information processing method and an information processing system.

2. Description of the Related Art

In the related art, a content conversion method is known in which, when a web page is accessed by a portable terminal, the size of an image included in the web page prepared for a personal computer (PC) is converted into one such that the web page can be easily viewed from the portable terminal (for example, see Japanese Laid-Open Patent Application No. 2003-271508).

SUMMARY OF THE INVENTION

According to one aspect of the present invention, an information processing apparatus displays a web page received from the outside on a display part based on one or more display elements included in the web page. The information processing apparatus includes a conversion part configured to convert, according to a predetermined conversion rule, a to-be-converted display element included in the one or more display elements included in the web page, when receiving the web page from the outside; and a display control part configured to display the web page on the display part based on the one or more display elements included in the web page when the one or more display elements included in the web page do not include the one or more to-be-converted display elements, and display a web page after conversion on the display part based on one or more converted display elements acquired from converting the one or more to-be-converted display elements when the one or more display elements included in the web page include the one or more to-be-converted display elements.

Other objects, features and advantages of the present invention will become more apparent from the following detailed description when read in conjunction with the accompanying drawings.

BRIEF DESCRIPTION OF THE DRAWINGS

FIGS. 9A-9C illustrate one example of another conversion process by the conversion processing part according to the first embodiment;

FIGS. 10A-10C illustrate one example of a change of a GUI by the other conversion process according to the first embodiment;

FIG. 11 is a block diagram illustrating one example of a functional configuration of the information processing apparatus other than the image forming apparatus according to the first embodiment;

FIG. 12 is a sequence diagram illustrating one example of the entire process by the information processing system according to the first embodiment;

FIG. 13 illustrates one example of an analysis process according to a second embodiment.

DETAILED DESCRIPTION OF THE EMBODIMENTS

Below, using the drawings, the embodiments of the present invention will be described in detail.

In the related art described above, it may be impossible to convert elements of a given web page into a tag, a function, a script of JavaScript (registered trademark) or so for using a function of an image forming apparatus having a display device. Therefore, labor may be needed for understanding and rewriting a tag or so for using a function of an image forming apparatus when developing a browser or such of the image forming apparatus or so.

One object of the embodiments is to provide a display device by which it is possible to convert an element of a web page according to a conversion rule.

Below, the embodiments will be described.

First Embodiment

<Entire Configuration>

Figure 1:
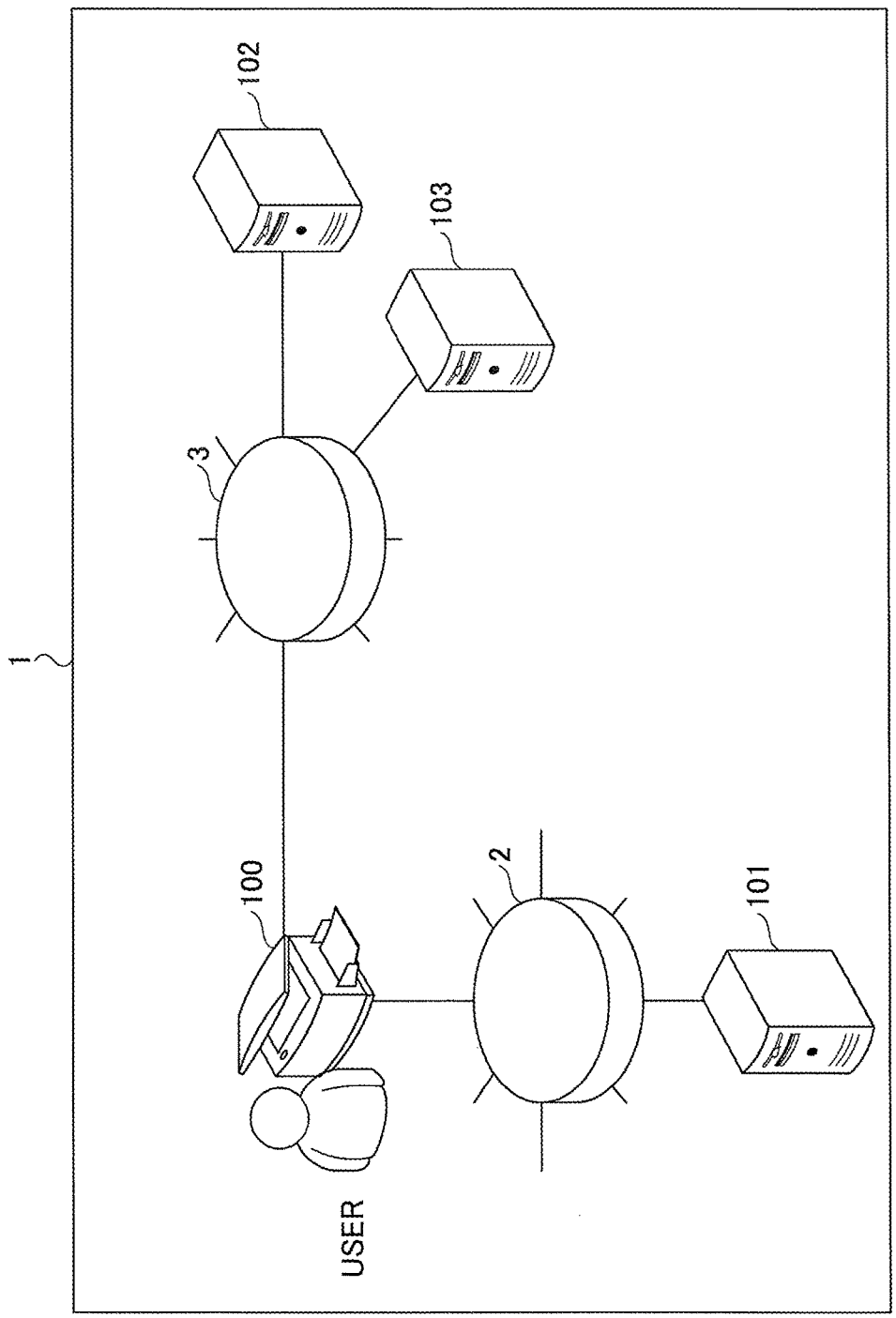
FIG. 1 is a system diagram illustrating one example of a configuration of an information processing system according to a first embodiment.

FIG. 1 is a system diagram illustrating one example of a configuration of an information processing system according to the first embodiment.

The information processing system 1 includes an image forming apparatus 100, an internal server 101, an external server 102 and a program server 103.

The image forming apparatus 100 and the internal server 101 are connected by, for example, a network such as a Local Area Network (LAN) 2. Below, description will be made assuming using the LAN 2, for example.

The image forming apparatus 100, the external server 102 and the program server 103 are connected, for example, by a network such as the Internet 3. Below, description will be made assuming using the Internet 3, for example.

The image forming apparatus 100 is one example of an information processing apparatus. Below, description will be made assuming using the image forming apparatus 100, for example, as an information processing apparatus. The image forming apparatus 100 is a multifunction peripheral, a copier or such.

The internal server 101 and the external server 102 are also information processing apparatuses such as servers.

The program server 103 is also an information processing apparatus such as a server. The program server 103 stores a program for a conversion process described later.

Note that, a specific manner of connecting the respective apparatuses is not limited to FIG. 1. For example, the program server 103 can be connected to the LAN 2. Also, the connections with the Internet 3 can be made via the LAN 2.

Note that, each network can include a plurality of networks. For example, the LAN 2 can include two or more networks connected via a separate node(s) such as a server(s), a router(s), an access point(s) and/or the like.

The image forming apparatus 100 is connected to the internal server 101 via the LAN 2. Also, the image forming apparatus 100 is connected to the external server 102 via the Internet 3. The image forming apparatus 100 is connected to the internal server 101 or the external server 102 through, for example, software for communication such as a web browser.

<Hardware Configuration of Image Forming Apparatus>

Figure 2:
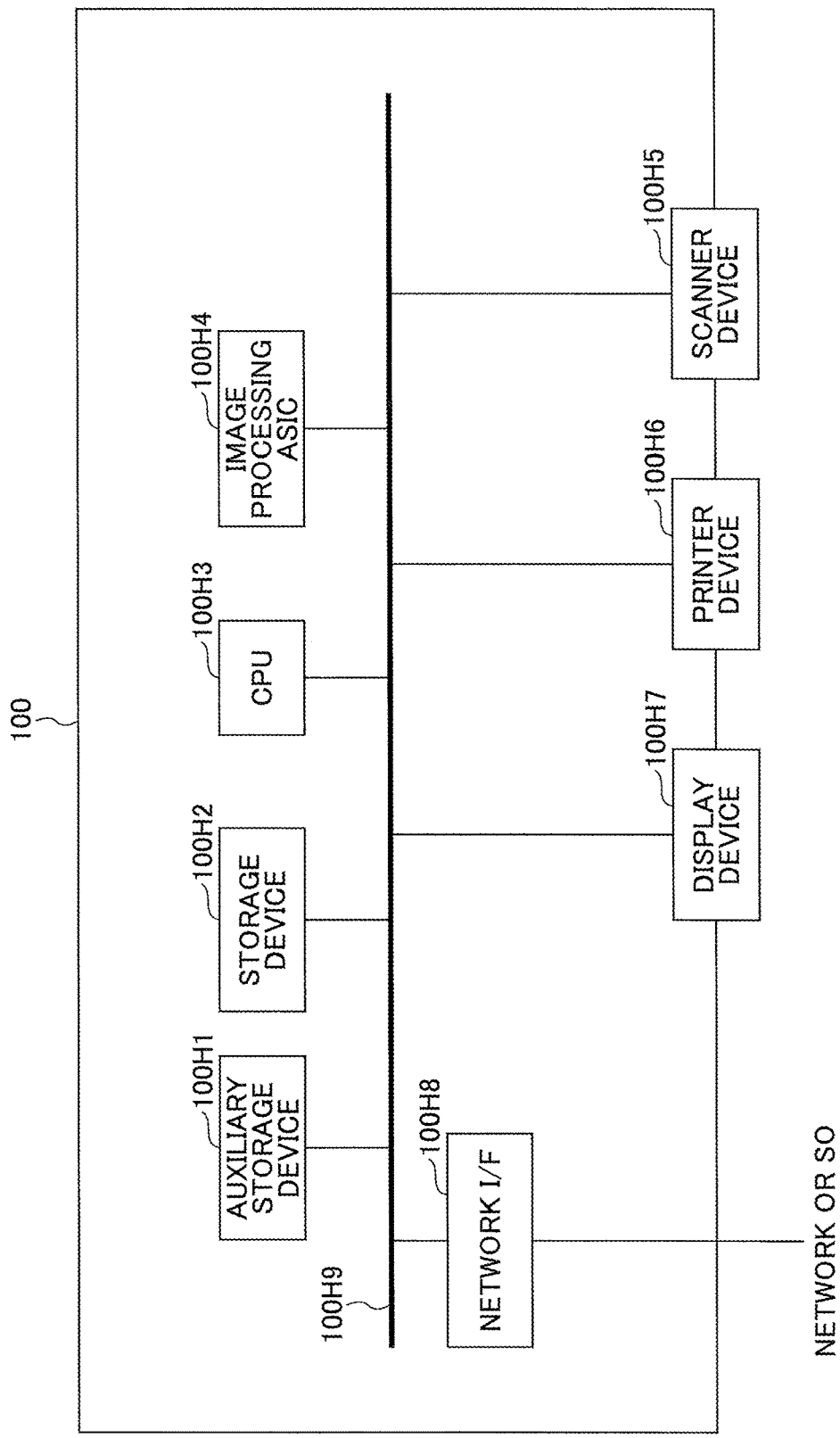
FIG. 2 is a block diagram illustrating one example of a hardware configuration of an image forming apparatus according to the first embodiment.

FIG. 2 is a block diagram illustrating one example of a hardware configuration of the image forming apparatus 100 according to the first embodiment.

The image forming apparatus 100 includes an auxiliary storage device 100H1, a storage device 100H2, a Central Processing Unit (CPU) 100H3 and an image processing ASIC 100H4. Further, the image forming apparatus 100 includes a scanner device 100H5, a printer device 100H6, a display device 100H7 and a network I/F 100H8.

The respective parts of the image forming apparatus 100 are connected via a bus 100H9. Note that the connections to the bus 100H9 can be made via bridge circuits (not illustrated). Also, the configuration of the image forming apparatus 100 is not limited to the configuration of FIG. 2. The image forming apparatus 100 can have a plurality of buses such that parts carrying out processes with high speed data transmission such as data input to and/or data output from the CPU 100H3 and parts carrying out processes with low speed data transmission such as the display device 100H7 are connected to different buses.

The auxiliary storage device 100H1 is an auxiliary storage device for storing data such as images, font data to be used for printing, various forms and so forth. The auxiliary storage device 100H1 is a hard disk drive or such. The auxiliary storage device 100H1 includes a control device (not illustrated) controlling reading data and writing data under the control of the CPU 100H3 described later. The control device is, for example, an electronic circuit for carrying out control operations.

The storage device 100H2 is a memory (or memories). The storage device 100H2 includes a Random Access Memory (RAM), a Read-Only Memory (ROM) and/or the like. The storage device 100H2 is used as an image buffer to be used for image formation, a code buffer, a work area of the CPU 100H3 and/or the like and stores information such as data, programs, parameters, and/or the like, to be used by the CPU 100H3 and/or the image processing ASIC 100H4.

The CPU 100H3 controls the entirety and the respective parts of the image forming apparatus 100 and executes various processes.

The image processing ASIC 100H4 has a processing circuit(s) for image processing. The image processing executed by the image processing ASIC 100H4 includes a process of rotating an image, a process of changing the format of image data, and so forth.

The scanner device 100H5 reads images, characters/letters, figures, and/or the like, formed on a recording medium, and generates image data.

The printer device 100H6 forms an image on a recording medium.

The display device 100H7 is used as an input device such as a touch panel for inputting the user's operations to the image forming apparatus 100 and an output device for performing a display for the user to input operations. Note that the display device 100H7 is not limited to a touch panel. For example, the display device 100H7 can be a device where a display device such as a liquid crystal device as an output device and a switch (e), a keyboard and/or a key panel as an input device are combined.

The network I/F 100H8 is, the same as the network I/F 101H8 of FIG. 2, an interface for connected to a network such as a LAN or the Internet.

The image forming apparatus 100 stores image data that is input from the scanner device 100H5 or the network I/F 100H8 in the auxiliary storage device 100H1. The image forming apparatus 100 outputs image data stored in the auxiliary storage device 100H1 by forming an image on a recording medium through the printer device 100H6.

Note that, in the image forming apparatus 100, it is not necessary to include all the parts illustrated in FIG. 2 as hardware components. For example, the image forming apparatus 100 does not necessarily include the scanner device 100H5.

<Hardware Configuration of Information Processing Apparatus>

Figure 3:
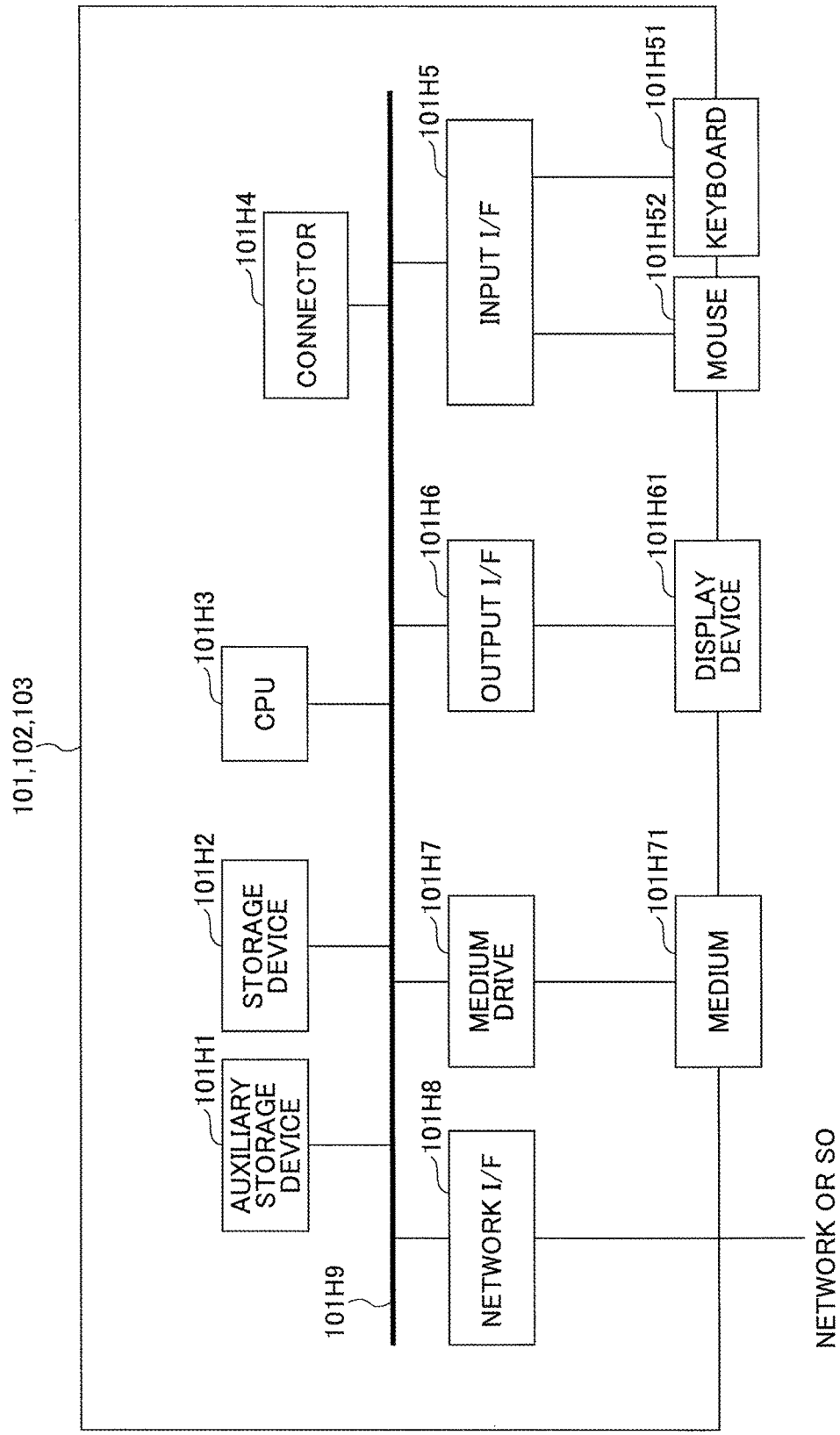
FIG. 3 is a block diagram illustrating one example of a hardware configuration of an information processing apparatus other than the image forming apparatus according to the first embodiment.

FIG. 3 is a block diagram illustrating one example of a hardware configuration of the information processing apparatus other than the image forming apparatus according to the first embodiment. The information processing apparatus is any one of the internal server 101, the external server 102 and the program server 103. Below, description will be made assuming that the information processing apparatus is the internal server 101, for example.

The internal server 101 is a computer, and has a hardware configuration as illustrated in FIG. 3.

The internal server 101 includes an auxiliary storage device 101H1, a storage device 101H2, a CPU 101H3, a connector 101H4, an input I/F 101H5, an output I/F 101H6 and a medium drive 101H7.

The internal server 101 further has a network I/F 101H8 and is connected to a network such as the LAN 2.

The respective parts of the internal server 101 are connected via a bus 101H9. Note that the connections to the bus 101H9 can be made via bridge circuits (not illustrated). The configuration of the internal server 101 is not limited to one illustrated in FIG. 3. For example, the internal server 101 can have a plurality of buses such that parts carrying out processes with high speed data transmission such as data input to and/or data output from the CPU 101H3 and parts carrying out processes with low speed data transmission such as the input I/F 101H5 are connected to different buses.

The auxiliary storage device 101H1 stores information such as various data including an intermediate result of a process executed by the CPU 101H3, parameters, programs, and so forth, under the control of the CPU 101H3, a control device (not illustrated) or so. The auxiliary storage device 101H1 is, for example, a hard disk drive, a flash Solid State Drive (SSD) or so. Note that the auxiliary storage device 101H1 can be a hard disk drive connected via the connector 101H4 or the network I/F 101H8, or an external apparatus (not illustrated) such as a Network Attached Storage (NAS). All or some of the information stored by the auxiliary storage device 101H1 can be stored by, instead of the auxiliary storage device 101H1, a file server (not illustrated) connected via the network I/F 101H8.

The storage device 101H2 is a main storage device, i.e., a so-called "memory" or so providing a storage area used by a program executed by the CPU 101H3. The storage device 101H2 stores information such as data, programs, parameters and/or the like.

Note that, the device type of the memory is, for example, a Static Random Access Memory (SRAM), a Dynamic Random Access Memory (DRAM) or so.

The CPU 101H3 carries out operations and control for various processes performed by the internal server 101. The CPU 101H3 carries out inputting and outputting information, via the bus 101H9, to/from the auxiliary storage device 101H1, the storage device 101H2, the input I/F 101H5 and the output I/F 101H6. The CPU 101H3 executes various programs.

Note that, in order to implement high speed processing in a parallel processing manner, the CPU 101H3 can include a plurality of CPUs or a plurality of cores. Also, processing of the CPU 101H3 can be assisted by another hardware resource(s) inside or outside the internal server 101.

The connector 101H4 is a bus, i.e., a so called "external bus", for inputting and outputting to/from an external apparatus (not illustrated). The connector 101H4 is, for example, a Universal Serial Bus (USB), The Institute of Electrical and Electronics Engineers, Inc. (IEEE) 1394, a Thunderbolt (registered trademark), or so. The connector 101H4 includes physical connection terminals such as connection pins having connector shapes in conformity to a standard, a processing circuit (not illustrated) processing a signal that is input via the connection terminals, a driver (not illustrated), and/or the like. Note that the connector 101H4 is not limited to be one for a wired connection. For example, the connector 101H4 can be one for a wireless connection such as Bluetooth (registered trademark).

The input I/F 101H5 is an interface for connecting the internal server 101 with an input device. The input device can be a keyboard 101H51 or so for inputting commands or so. The input device can also be a mouse 101H52 or so for inputting a two-dimensional moving distance to the internal server 101. The input device can also be a pen tablet, a pointing device or so. Note that the input device can have such a configuration as to be connected with the connector 101H4.

The output I/F 101H6 includes a processing circuit (not illustrated) controlling an image signal to be output to the display device 101H61 that is an output device for outputting a processing result of so, a driver (not illustrated), a cable (not illustrated) and so forth. Note that the output device can be, instead of the display device 101H61, a projection device such as a projector.

Note that the input device connected with the input I/F 101H5 and the output device connected with the output I/F 101H6 can be a device including the input device and the output device in a single unit, i.e., a so-called "touch panel" or so.

The medium drive 101H7 is connected with a medium 101H71 that is a recording medium, and carries out a process for inputting information thereto and outputting information therefrom. The medium 101H71 is an optical disk such as a Compact Disc Read-Only Memory (CD-ROM), a Digital Versatile Disk (DVD), a Blu-ray disc or so.

The medium 101H71 can also be a magnetic disk such as a flexible disk, a SD (registered trademark) card, or a flash memory such as a compact flash (registered trademark). Note that the inputting information and the outputting information can be carried out with a USB memory connected to the connector 101H4 or the network I/F 101H8 described later.

The network I/F 101H8 is an interface for connecting the internal server 101 to a network such as a LAN in a wired manner or a wireless manner. The network I/F 101H8 includes physical connection terminals such as connection pins having connector shapes in conformity to a standard such as IEEE and a cable for physically connecting the internal server 101 to a line or a network. Also, the network I/F 101H8 includes a processing circuit (not illustrated) processing a signal that is input via the connection terminals and a driver (not illustrated). Note that, the internal server 101 can be connected with another network or the Internet via a LAN.

The bus 101H9 is used for communication among the respective parts of the internal server 101. The bus 101H9 is a so-called "internal bus". The bus 101H9 is a PCI Express (Peripheral Component Interconnect Bus Express). The bus 101H9 can also be a PCI, an Industry Standard Architecture (ISA) or so.

The internal server 101 can have a processor for carrying out a process concerning an image, i.e., a so-called "Graphics Processing Unit" (GPU) (not illustrated), and a storage device (not illustrated) to be used for the process concerning an image.

Note that the internal server 101 does not necessarily include the respective parts illustrated in FIG. 3 as hardware elements. The internal server 101 does not necessarily have the medium drive 101H7, for example.

Note that some or all of the processes executed by the internal server 101 can be implemented by a firmware by using a Digital Signal Processor (DSP) board or so.

Further, a circuit(s) that can execute all or some of the processes of the internal server 101 can be implemented by an Application Specific Integrated Circuit (ASIC), instead of executing the various programs. Also, a circuit(s) that can execute all or some of the processes of the internal server 101 can be implemented by a System in a Package (SiP), instead of executing the various programs. Also, instead of an ASIC, a Field-Programmable Gate Array (FPGA), a Complex Programmable Logic Device (CPLD), or such, can be used to implement the circuit(s) that can execute all or some of the processes of the internal server 101.

<Functional Configuration of Image Forming Apparatus>

Figure 4:
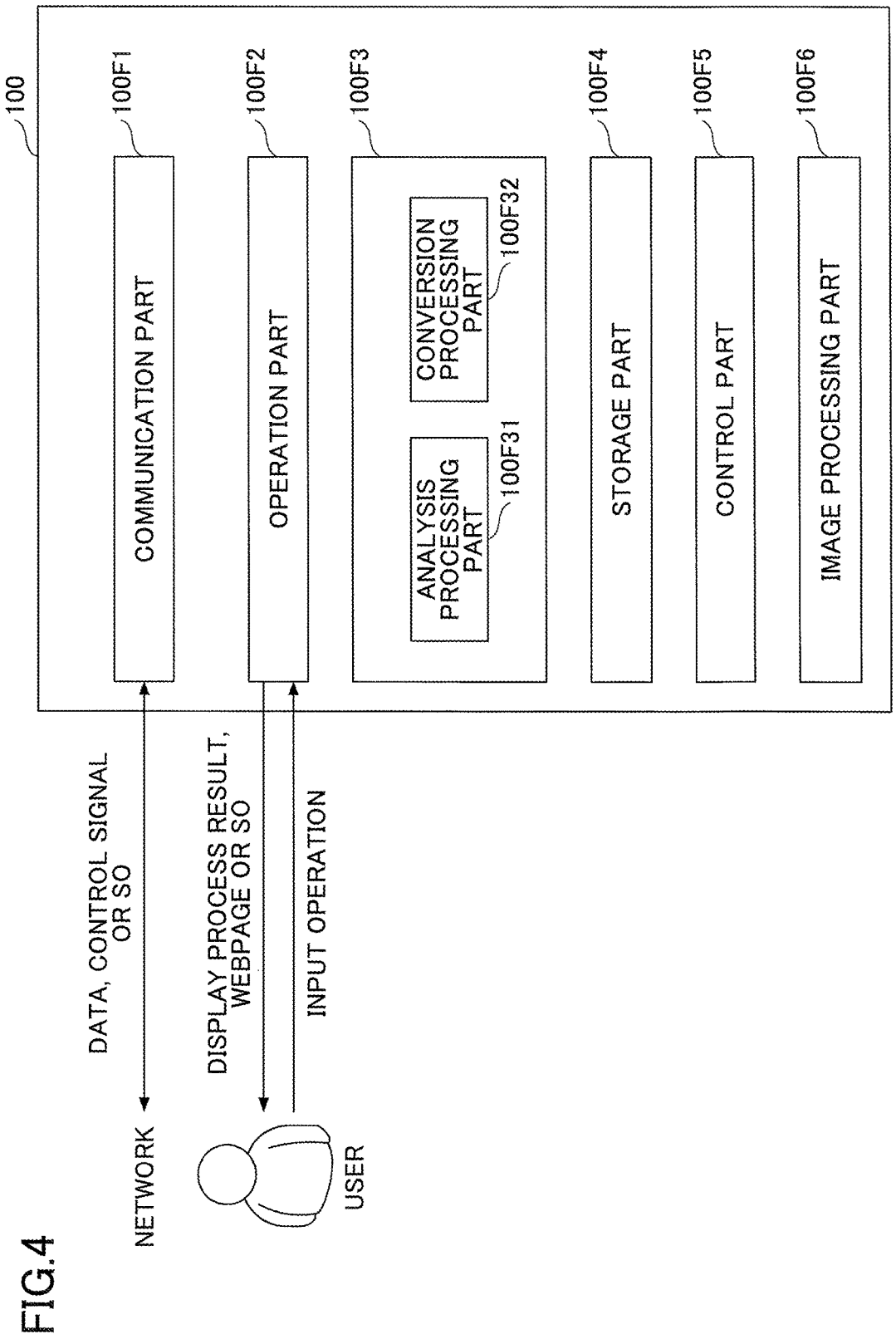
FIG. 4 is a functional block diagram illustrating one example of a functional configuration of the image forming apparatus according to the first embodiment.

FIG. 4 is a functional block diagram illustrating one example of a functional configuration of the image forming apparatus according to the first embodiment.

The image forming apparatus 100 includes a communication part 100F1, an operation part 100F2, a processing part 100F3, a storage part 100F4, a control part 100F5 and an image processing part 100F6.

The communication part 100F1 is used for the image forming apparatus 100 to connect to, via a network, the internal server 101, the external server 102 or the program server 103. The communication part 100F1 carries out processes for connecting to an external apparatus and transmitting and receiving data such as a web page, a program or so, or information such as a control signal. The communication part 100F1 is implemented by the CPU 100H3 and the network I/F 100H8 of FIG. 2.

Note that the communication part 100F1 can also carry out a process of converting the format of information or data that is input or output such that it can be read in a process of a subsequent stage or it can be processed at high speed.

The operation part 100F2 displays, to the user, a processing result of the processing part 100F3 or data such as a web page to which the communication part 100F1 is used to connect. The operation part 100F2 is implemented by the CPU 100H3 and the display device 100H7 of FIG. 2.

Note that the operation part 100F2 can carry out a process of converting data to be displayed to have such a format that the display device 100H7 of FIG. 2 can process it, a D-A converting process, and/or the like.

The operation part 100F2 carries out a process for allowing the user to input a setting for a process of forming an image through the image processing part 100F6, or so.

The operation part 100F2 uses a browser (hereinafter, referred to as an "apparatus browser") for carrying out a display to the user and inputting the user's operation.

The processing part 100F3 carries out various processes based on a program(s). The processing part 100F3 is implemented by the CPU 100H3 of FIG. 2. The processing part 100F3 includes an analysis processing part 100F31 and a conversion processing part 100F32.

The analysis processing part 100F31 carries out an analysis process.

<Analysis Process>

The analysis process is a process of reading a tag or a script that is input to a web page transmitted from the outside and analyzing an element that is input in HTML or so. The analysis process is a process executed by the analysis processing part 100F31 of the image forming apparatus 100 based on the control of a rewriting program. The analysis process is a process of determining whether respective elements that are input into the web page are processing targets of conversion processes.

Information to be used for the analysis process (hereinafter, referred to as "conversion rule data") will now be described.

Figures 5, 6:
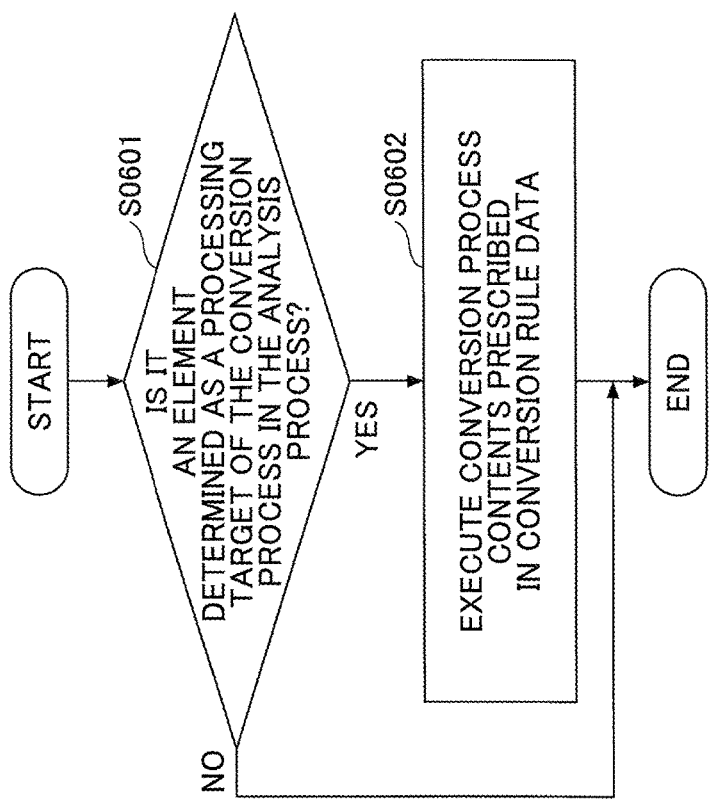
FIG. 5 illustrates conversion rule data according to the first embodiment.
FIG. 6 is a flowchart illustrating one example of a conversion process by a conversion processing part according to the first embodiment.

FIG. 5 illustrates the conversion rule data 4 according to the first embodiment.

In the conversion rule data 4, a "conversion target element" and "conversion process contents" are set.

The "conversion target element" denotes an element as a processing target of a conversion process. In FIG. 5, an element where a "class" attribute of "form" is set as "scanForm" is input as a processing target of a conversion process.

Note that the "conversion target element" is not limited to a case where a setting is made as "scanForm" mentioned above. As the "conversion target element", an item concerning a so-called "selector" for designating the value of "id" or "attribute", or a target to which CSS is applied, can be input.

The "conversion process contents" denote the contents of the conversion process. For example, in FIG. 5, a process of 'generating a scan setting form in a "form" element' is set as the contents of the conversion process.

Note that the conversion rule data is not limited to the conversion rule data 4 mentioned above. The conversion rule data can be a program or data described by using a so-called "if statement" or so.

The conversion processing part 100F32 carries out the conversion process.

<Conversion Process>

The conversion process is a process where the conversion processing part 100F32 of the image forming apparatus 100 executes the conversion process contents that are set in the conversion rule data based on the control of the rewriting program.

FIG. 6 is a flowchart illustrating one example of the conversion process by the conversion processing part 100F32 according to the first embodiment.

In Step S0601, the conversion processing part 100F32 of the image forming apparatus 100 determines, based on the analysis result of the analysis process in the previous stage, whether it is necessary to carry out the conversion process on the target element. When determining that it is necessary to carry out the conversion process on the target element (YES in Step S0601), the conversion processing part 100F32 of the image forming apparatus 100 proceeds to Step S0602. When determining that it is not necessary to carry out the conversion process on the target element (NO in Step S0601), the conversion processing part 100F32 of the image forming apparatus 100 finishes the current process while carrying out no process on the target element.

In Step S0602, the conversion processing part 100F32 of the image forming apparatus 100 executes the conversion process contents according to the conversion rule data.

In Step S0602, on the element that is thus determined as the "conversion target element" that is input in the conversion rule data 4 of FIG. 5, the process that is set in the corresponding "conversion process contents" is carried out.

Figure 7:
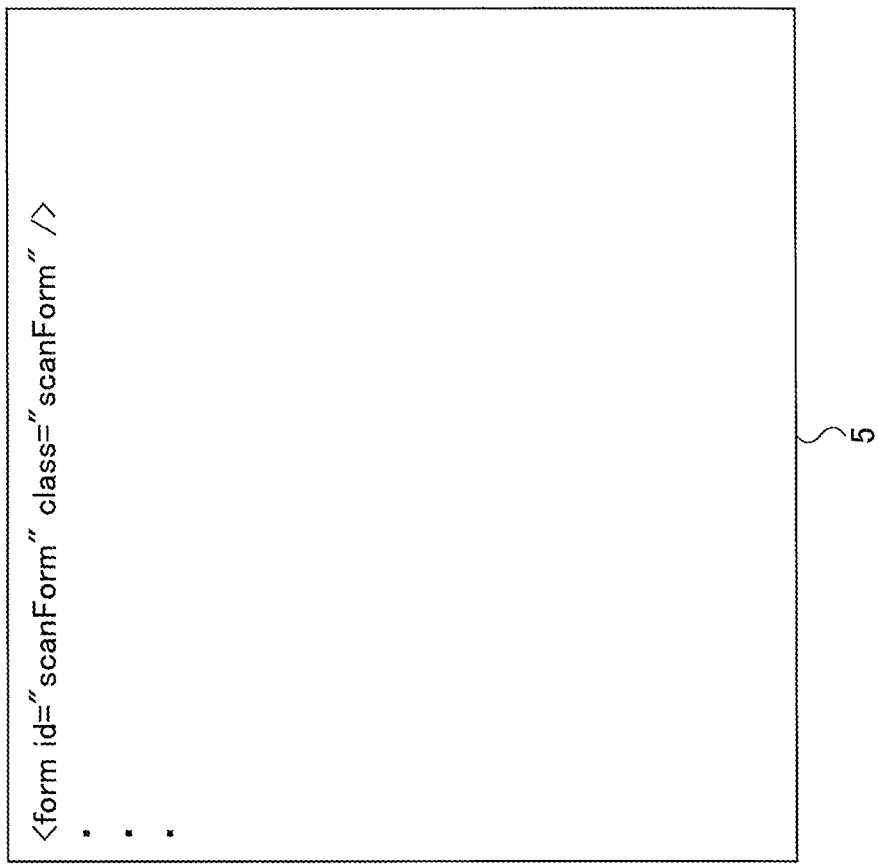
FIGS. 7A-7B illustrate one example of a conversion process by the conversion processing part according to the first embodiment.

FIGS. 7A-7B illustrate one example of the conversion process by the conversion processing part 100F32 according to the first embodiment.

FIG. 7A illustrates one example of a web page transmitted from the outside. Below, the conversion process will be described using the web page 5 as an example. Also, a case will now be assumed where the conversion rule data is the conversion rule data 4 of FIG. 5, for example.

As illustrated in FIG. 7A, when the web page 5 includes an element as the "conversion target element", the conversion processing part 100F32 of the image forming apparatus 100 carries out the process that is set in the "conversion process contents", in the conversion process.

FIG. 7B illustrates an example of a case where, on the web page 5, the process that is set in the "conversion process contents" is carried out, in the conversion process.

As shown in FIG. 7B, the web page after conversion 6 is a web page in which, on "scanForm" that is set in the "conversion target element" of the web page 5, the process of 'generating a scan setting form in a "form" element' that is set in the "conversion process contents" of the conversion rule data 4 is carried out. The process of 'generating a scan setting form in a "form" element' is a process of, as illustrated in FIG. 7B, generating and adding the scanner setting items 61.

The scanner setting items 61 illustrated in FIG. 7B include elements to be set for a scan function which can be used in the image forming apparatus 100. FIG. 7B illustrates an example of a case where, in the scanner setting items 61, "input" elements and so forth are generated. The "input" elements include an element "scanColor" concerning a color setting; an element "fileFormat" concerning a setting of a data format to be generated; and an element "originalSide" concerning a setting of an orientation of an original document.

The scanner setting items 61 are such that various setting items are input through the user's operations from a Graphical User Interface (GUI). As illustrated in FIG. 7B, the scanner setting items 61 include "button" elements. The "button" elements are used to generate a GUI such as dialogs which the user operate.

Figure 8:
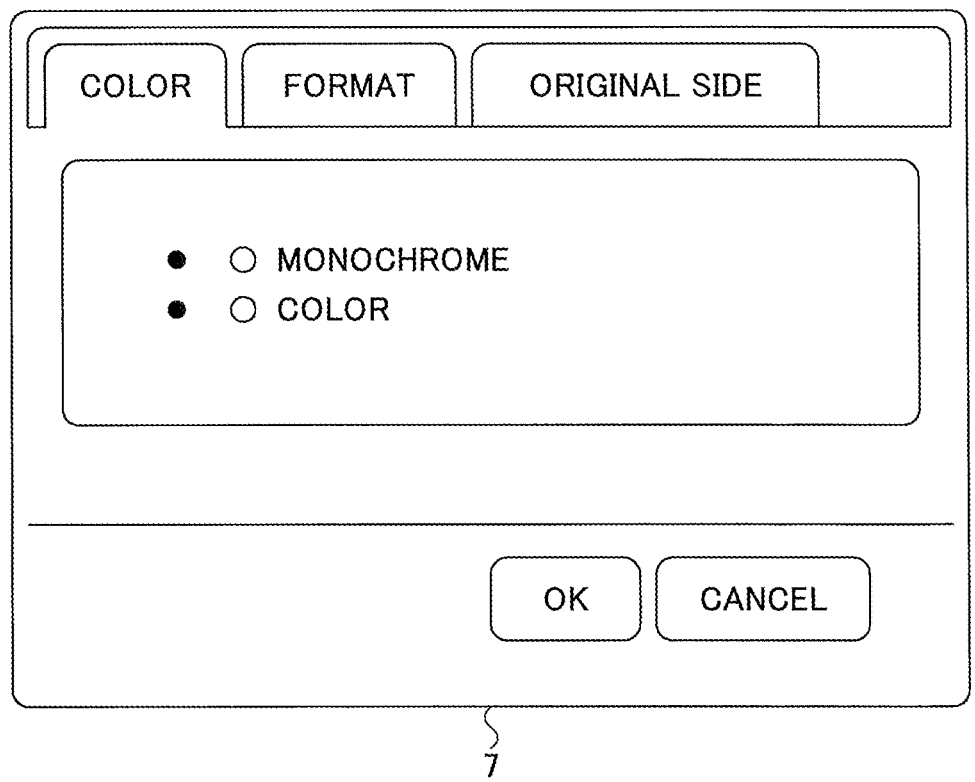
FIG. 8 illustrates one example of a GUI for settings according to the first embodiment.

FIG. 8 illustrates one example of a GUI for settings according to the first embodiment.

A scan function setting GUI 7 illustrated in FIG. 8 is one example of a form for settings.

The user operates the scan function setting GUI 7 and inputs settings for the scan function. The operations of the user are input to the "value" elements of the "input" elements. As a result of the user pressing the "OK" button in the scan function setting GUI 7, various settings are input to the "value" elements of the "input" elements.

As a result of the inputs being made to the "value" elements of the "input" elements, it is possible to use the set values from JavaScript executed at the side of the external server 102. JavaScript executed at the side of the external server 102 is capable of transferring the set values to extended JavaScript prepared to start scanning.

By inputting the "button" elements, the user is allowed to make settings for the scan function.

Note that the process described above using FIG. 7B corresponds to a case where the "form" element is generated by using "hidden" parameters. However, the process that is set in the "conversion process contents" is not limited thereto. Instead of the "form" element, a "div" element can be generated.

Through the conversion process, it is possible to rewrite an element in a web page into a tag for using the scan function of the image forming apparatus.

FIGS. 9A-9C illustrate one example of another conversion process by the conversion processing part according to the first embodiment.

FIG. 9A illustrates another example of a web page 8 transmitted in Step S1202 of FIG. 12. Below, the other conversion process will be described using the web page 8, for example.

FIG. 9C illustrates an example of conversion rule data 9 used for the other conversion process. The other conversion process will now be described for a case of applying the conversion rule data 9 of FIG. 9C.

As illustrated in the conversion rule data 9 of FIG. 9C, the web page 8 has an input element 81 that is set in the "conversion target element" of the conversion rule data 9. The other conversion process is a process of converting the input element 81.

FIG. 9B illustrates one example of a case where, through the other conversion process, the "input" element is converted into an extended tag.

The web page after conversion 10 illustrated in FIG. 9B is a web page where the input element 81 of the web page 8 is converted into an extended tag 11.

When uploading a file to a web service or so from the image forming apparatus, image files scanned by the scanner device 100H5 of FIG. 2 are uploaded in many cases.

As a result of thus providing the 'scan:input type="file"' element 11 as illustrated as the extended tag 11, it is possible to use the scan function from the apparatus browser through the operation part 100F2 of the image forming apparatus 100.

FIGS. 10A-10C illustrate one example of a change of a GUI by the other conversion process according to the first embodiment.

FIG. 10A illustrates one example of a state before the other conversion process is carried out. The scan GUI before conversion 12 of FIG. 10A corresponds to a state where the web page 8 of FIG. 9A is executed.

FIG. 10B illustrates one example of a state after the other conversion process is carried out. The scan GUI after conversion 13 of FIG. 10B corresponds to a state where the web page after conversion 10 of FIG. 9B is executed.

Comparing between the scan GUI before conversion 12 and the scan GUI after conversion 13, it can be seen that a "SELECT FILE" button 121 is changed into a "SCAN" button 131.

The "SELECT FILE" button 121 is prepared for the user to select an image file to be input. The "SCAN" button 131 is prepared for the user to make scan settings to generate image data through the scan function based on the thus made scan settings.

When the user clicks the "SCAN" button 131, a screen page of a form for executing the scan function is output.

FIG. 10C illustrates one example of the screen page of a form for executing the scan function.

A scanner execution GUI 14 of FIG. 10C has a GUI for the user to make scan settings similar to the scan function setting GUI 7 of FIG. 8. The scanner execution GUI 14 allows the user to make various settings of the scan function. When the user presses the "START" button of the scanner execution GUI 14, the image processing part 100F6 carries out a process concerning the scan function.

When the process by the image processing part 100F6 is finished, an image file is generated. The image file has the same state as an image file selected by the "SELECT FILE" button 121. That is, the image file is set to have the value of the 'input type="file"' element 81 in the web page before conversion 8 of FIG. 9A. As a result of the image file being set to have the value of the 'input type="file"' element 81, the image file is used as a file to be input to the form.

Through the other conversion process, it is possible to rewrite an element in a web page into a tag for using the scan function of the image forming apparatus. It is possible to omit the labor of a developer of a web page otherwise required for separately preparing a web page considering a connection from the image forming apparatus.

Also, by using the extended tag, it is possible to reduce a process of taking the set value from a "form" element and transferring a parameter to an Application Programming Interface (API) prepared for a scanner process or a print process.

The storage part 100F4 stores data for the processing part 100F3 to execute various processes. The storage part 100F4 is implemented by the CPU 100H3 and the auxiliary storage device 100H1 of FIG. 2. Note that the storage part 100F4 can also be implemented by the storage device 100H2 of FIG. 2. The storage part 100F4 stores the data of a web page, the data of a program, or so, downloaded by the communication part 100F1, in the auxiliary storage device 100H1 of FIG. 2 under the control of the CPU 100H3 of FIG. 2.

The control part 100F5 controls various elements such as hardware of the image forming apparatus 100. The control part 100F5 is implemented by the CPU 100H3 of FIG. 2. The control part 100F5 can also be implemented by a control device (not shown) of each apparatus.

The image processing part 100F6 carries out a process of converting printing data that is input by the communication part 100F1 through the image processing ASIC 100H4 of FIG. 2 and a process of forming an image on a recording medium such as paper through the printer device 100H6 of FIG. 2. The image processing part 100F6 is implemented by the CPU 100H3 of FIG. 2, the image processing ASIC 100H4 of FIG. 2, the scanner device 100H5 of FIG. 2 or the printer device 100H6 of FIG. 2.

<Functional Configuration of Information Processing Apparatus>

FIG. 11 is a block diagram illustrating one example of a functional configuration of the information processing apparatus other than the image forming apparatus according to the first embodiment.

The internal server 101, the external server 102 and the program server 103 have the same functional configurations. Below, description will be made for the internal server 101 for example.

The internal server 101 includes a communication part 101F1, a storage part 101F2 and a control part 101F3.

The communication part 101F1 transmits, to an external apparatus which is connected to the internal server 101 via a network, the data of a web page, the data of a program, or so, stored in the storage part 101F2. The communication part 100F1 is implemented by the CPU 101H3 and the network I/F 101H8 of FIG. 3.

Note that, the communication part 101F1 can carry out a process of converting the format of information or data that is input or output into one such that it can be read in a process of a subsequent stage or it can be processed at high speed.

The storage part 101F2 stores various data. The storage part 101F2 is implemented by the CPU 101H3 and the auxiliary storage device 101H1 of FIG. 3. Note that, the storage part 101F2 can also be implemented by the storage device 101H2 of FIG. 3.

The control part 101F3 controls the respective hardware elements of the internal server 101 and carries out respective processes. The control part 101F3 is implemented by the CPU 101H3 of FIG. 3. The control part 101F3 can also be implemented by a control device (not shown) of each apparatus.

<Entire Process>

FIG. 12 is a sequence diagram illustrating one example of the entire process by the information processing system according to the first embodiment.

In FIG. 12, a case will now be described where as a result of the user operating the image forming apparatus 100, it is connected to the external server 102 and uses a web application of the external server 102.

In Step S1201, the communication part 100F1 of the image forming apparatus 100 connects to the external server 102 to acquire a web page in response to the user's operation.

The web page is data including elements such as tags or scripts that are input in Hyper Text Markup Language (HTML) or so. The web page can also be data including elements that are input in Cascading Style Sheets (CSS) or JavaScript.

Step S1201 is a process of the user inputting operations of designating the web page by a Uniform Resource Locator (URL) and connecting to the external server 102 having the web page indicated by the URL.

In Step S1202, the communication part 101F1 of the external server 102 transmits the web page to the communication part 100F1 of the image forming apparatus 100. Step S1202 is a process of transmitting the data of the web page corresponding to the page designated by the user with the URL to the communication part 100F1 of the image forming apparatus 100.

In Step S1203, the communication part 100F1 of the image forming apparatus 100 requests a rewriting program for carrying out the analysis process and the conversion process from the program server 103.

In Step S1204, the communication part 101F1 of the program server 103 transmits the rewriting program to the communication part 100F1 of the image forming apparatus 100. The rewriting program includes the conversion rule data for carrying out the analysis process and the conversion process.

In Step S1205, the analysis processing part 100F31 of the image forming apparatus 100 carries out the analysis process on the acquired web page. Through the analysis process, the image forming apparatus 100 carries out various operations based on the web page. Through the analysis process, the image forming apparatus 100 searches for an element as a processing target of the conversion process. When the processing target element is thus acquired, the conversion processing part 100F32 of the image forming apparatus 100 carries out the conversion process.

In Step S1206, the conversion processing part 100F32 of the image forming apparatus 100 carries out the conversion process on the web page. The image forming apparatus 100 carries out various processes based on the web page on which the conversion process has been thus carried out.

In Step S1209, the image forming apparatus 100 displays the web page processed in Steps S1205 and S1206. When the image forming apparatus 100 determines in Step S1205 that there are no elements in the web page to be regarded as processing targets of the conversion process, the image forming apparatus 100 displays the web page acquired in Step S1202 without carrying out the conversion process in Step S1206.

Steps S1205 and Step S1206 are carried out repetitiously on each of all the elements of the web page. Note that Step S1206 is not limited to be executed immediately after Step S1205 at any time. In a case where the element is dynamically generated through an execution of a process, timing of executing Step S1206 can be changed depending on each element. For example, Step S1206 can be executed after the generation of the element.

Note that the conversion rule data is not necessarily included in the rewriting program. The conversion rule data can be stored separate to the rewriting program, and can be transmitted separate to the rewriting program. The case where the conversion rule data and the rewriting program are thus separately provided will now be described. In this case, the image forming apparatus 100 can acquire a program for carrying out the analysis process (hereinafter, referred to as an "analysis program") and carry out the analysis process using the analysis program.

In this case, in Step S1203, the communication part 100F1 of the image forming apparatus 100 requests the conversion rule data for carrying out to the analysis process and the analysis program from the program server 103.

In Step S1204, the communication part 101F1 of the external server 102 transmits, to the communication part 100F1 of the image forming apparatus 100, the conversion rule data and the analysis program.

In Step S1205, the image forming apparatus 100 carries out the analysis process on the acquired web page based on the conversion rule data using the analysis program.

In Step S1206, the conversion processing part 100F32 of the image forming apparatus 100 carries out the conversion process on the web page.

In Step S1207, the conversion processing part 100F32 of the image forming apparatus 100 requests the rewriting program needed for the conversion process from the program server 103. When determining, based on the analysis result, that there is an element as a processing target of the conversion process, the conversion processing part 100F32 of the image forming apparatus 100 requests the rewriting program corresponding to the element determined as the processing target of the conversion process.

By thus acquiring the corresponding rewriting program based on the analysis result, it is possible to carry out the conversion process using the latest program.

In Step S1208, the communication part 101F1 of the external server 102 transmits, to the communication part 100F1 of the image forming apparatus 100, the rewriting program.

By converting an element of a web page into an extended tag through the other conversion process, the user can use a web page not compatible to a function of the image forming apparatus in a state where the web page is converted into such a web page as to use the function of the image forming apparatus.

Second Embodiment

A second embodiment uses the information processing system 1 of the first embodiment. The duplicate description of the information processing system 1 will be omitted.

The second embodiment uses the image forming apparatus 100, the internal server 101, the external server 102 and the program server 103. Duplicate description for the image forming apparatus 100, the internal server 101 and the external server 102 will be omitted.

The entire process of the second embodiment is the same as the first embodiment shown in FIG. 12. Duplicate description for the entire process will be omitted.

The second embodiment is different from the first embodiment in the analysis process.

In the first embodiment, an element of a processing target of the conversion process is set in the "conversion target element" of the conversion rule data 4 of FIG. 5, and any processing target element corresponding to the "conversion target element" that is input in the web page 5 is converted through the conversion process without exception.

In the analysis process of the second embodiment, determination of a processing target of the conversion process is carried out depending on a "function".

FIG. 13 illustrates one example of the analysis process according to the second embodiment.

Description will be made for a case where the image forming apparatus 100 has the scan function, an address book function and a print function. Further, the description will be made for a case where such a setting is made that elements concerning the scan function and the address book function are regarded as processing targets of the conversion process while even the same functions concerning the print function are not regarded as processing targets of the conversion process.

A web page 15 of FIG. 13 is one example of a web page for the analysis process of the second embodiment. The web page 15 has a metatag 151. The metatag 151 is settings to limit elements to be regarded as processing targets of the conversion process concerning a predetermined function. The metatag 151 is an example of settings to set elements concerning the scan function and the address book function as processing targets of the conversion process.

By thus limiting elements to be regarded to be as processing targets of the conversion process to those concerning the scan function and the address book function by using the metatag 151, it is possible to exclude elements concerning the print function from processing targets of the conversion process. As a result, even when an element corresponding to the "conversion target element" of the conversion rule data 4 is, by accident, included in the web page 15 as an element concerning the print function, it is possible to reduce the generation of unnecessary GUIs.

Further, there is a case where a developer of a web page prepares a unique GUI for the purpose of design consistency. By using the metatag 151, it is possible to reduce cases where even elements for using the unique GUI are regarded as processing targets of the conversion process.

By using a metatag, it is possible to limit elements to be regarded as processing targets of the conversion process for a predetermined function. By thus limiting processing targets of the conversion process, it is possible to better identify processing targets of the conversion process.

By making a setting to limit elements regarded as processing targets of the conversion process for a predetermined function, it is possible to reduce such conversion processes that are unexpected by a person who sets the corresponding conversion rule data.

Third Embodiment

A third embodiment uses the information processing system 1 of the first embodiment. The duplicate description of the information processing system 1 will be omitted.

The third embodiment uses the image forming apparatus 100, the internal server 101, the external server 102 and the program server 103. Duplicate descriptions for the image forming apparatus 100, the internal server 101 and the external server 102 will be omitted.

The entire process of the third embodiment is the same as the first embodiment shown in FIG. 12. Duplicate descriptions for the entire process will be omitted.

The third embodiment is different from the first embodiment in the conversion process.

Figure 14:
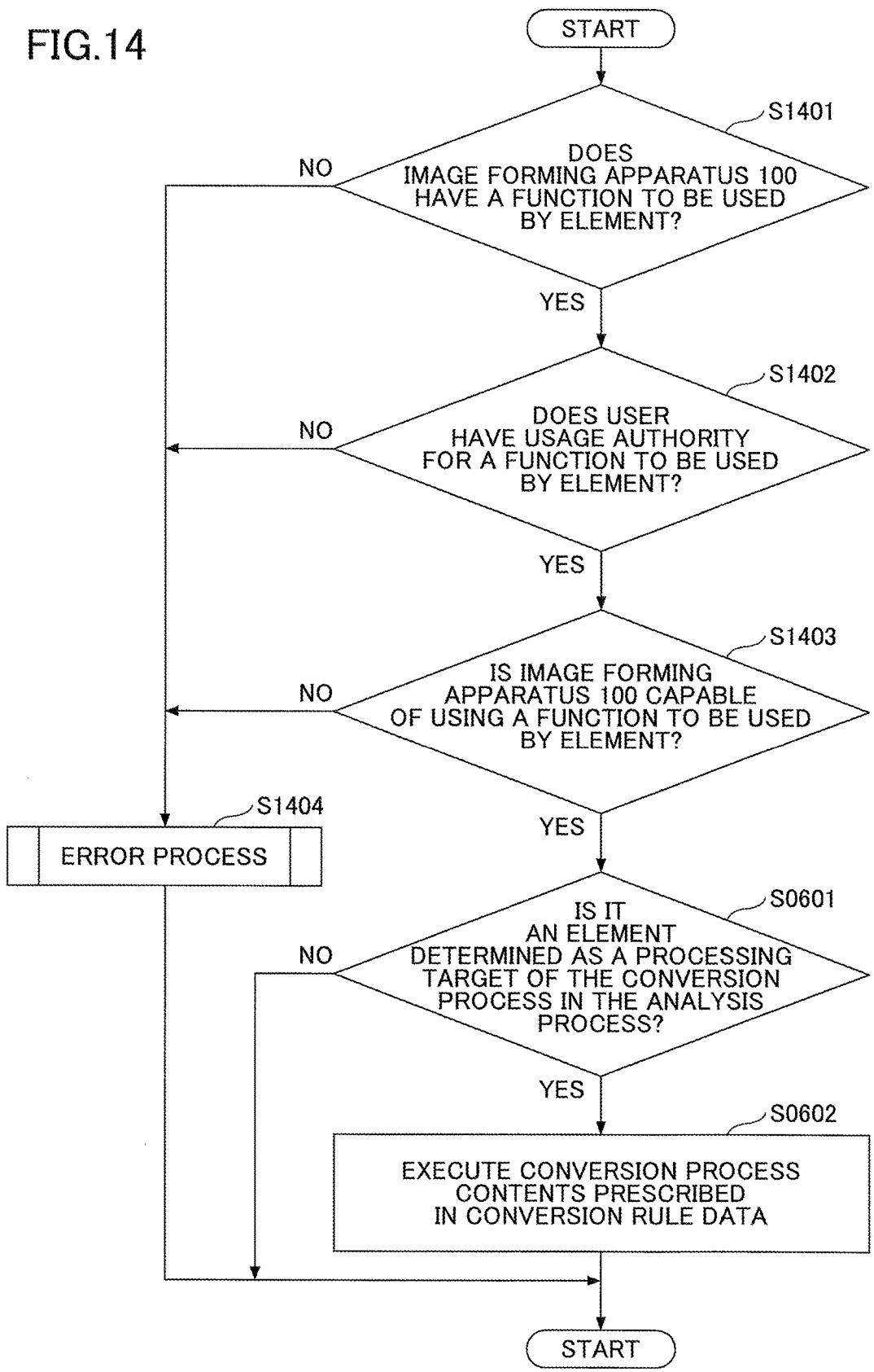
FIG. 14 is a flowchart illustrating one example of a conversion process by a conversion processing part according to a third embodiment.

FIG. 14 is a flowchart illustrating one example of the conversion process by the conversion processing part according to the third embodiment.

The conversion process according to the third embodiment is different from the conversion process according to the first embodiment of FIG. 6 in that Steps S1401-S1404 are added. In FIG. 14, for the same steps as the conversion process of the first embodiment of FIG. 6, the same reference symbols are given and duplicate descriptions will be omitted.

In Step S1401, the conversion processing part 100F32 of the image forming apparatus 100 determines whether the image forming apparatus 100 has a function to be used by an "element". When the image forming apparatus 100 has a function to be used by an "element" (YES in Step S1401), the conversion processing part 100F32 of the image forming apparatus 100 proceeds to Step S1402. When the image forming apparatus 100 has no function to be used by an "element" (NO in Step S1401), the conversion processing part 100F32 of the image forming apparatus 100 proceeds to Step S1404.

Description will now be made for a case where the image forming apparatus 100 does not have the scan function, for example. In Step S1401, when an "element" concerning the scan function is a processing target of Step S1401, the conversion processing part 100F32 of the image forming apparatus 100 determines that the image forming apparatus 100 has no function to be used by the "element".

In Step S1402, the conversion processing part 100F32 of the image forming apparatus 100 determines whether the user has usage authority for the function to be used by the element. When the user has usage authority for the function to be used by the element (YES in Step S1402), the conversion processing part 100F32 of the image forming apparatus 100 proceeds to Step S1403. When the user has no usage authority for the function to be used by the element (NO in Step S1402), the conversion processing part 100F32 of the image forming apparatus 100 proceeds to Step S1404.

Description will now be made for a case where the user has no usage authority for the scan function of the image forming apparatus 100. In Step S1402, when an element concerning the scan function is the processing target of Step S1402, the conversion processing part 100F32 of the image forming apparatus 100 determines that the user has no usage authority for the function to be used by the element.

In Step S1403, the conversion processing part 100F32 of the image forming apparatus 100 determines whether the image forming apparatus 100 is capable of using the function to be used by the element. When the image forming apparatus 100 is capable of using the function to be used by the element (YES in Step S1403), the conversion processing part 100F32 of the image forming apparatus 100 proceeds to Step S0601. When the image forming apparatus 100 is not capable of using the function to be used by the element (NO in Step S1403), the conversion processing part 100F32 of the image forming apparatus 100 proceeds to Step S1404.

Description will now be made for a case where hardware of the image forming apparatus 100 to be used for carrying out the scan function is unusable because of a failure or such, for example. In Step S1403, when an element concerning the scan function is the processing target of Step S1403, the conversion processing part 100F32 of the image forming apparatus 100 determines that the image forming apparatus 100 is not capable of using the function to be used by the element.

In Step S1404, the conversion processing part 100F32 of the image forming apparatus 100 carries out an error process. The error process is a process of displaying the determination result of any one of Steps S1401-S1403 or an error message previously set in a tag to the user with a so-called "alert dialog", or so. Note that the error process is not limited to a process of displaying a message. The error process can be a process of displaying the element of the processing target of Step S1404.

There are a few cases where a person who creates a web page knows the functions of an image forming apparatus 100 connecting to the web page, settings in the image forming apparatus 100 and the states of the devices of the image forming apparatus 100. Therefore, there is a case where the web page has an element concerning a function that the image forming apparatus 100 does not have or an element concerning a function for which such a setting is made that the user is not allowed to use the function. Also, there is a case where the web page has an element concerning a function which is unusable because of a failure in the image forming apparatus 100 or so.

Through the determinations in Steps S1401-Step S1403, the processes are carried out for executing the conversion process contents prescribed in the conversion rule data for an element that the image forming apparatus 100 is capable of using. By thus carrying out the processes for executing the conversion process contents for an element that the image forming apparatus 100 is capable of using, it is possible to reduce processes of displaying unnecessary GUIs, or so.

Note that the order of executing Steps S1401-S1403 is not limited to that shown in FIG. 14. In FIG. 14, the order between Steps S1401 and S1403 can be reversed. Also, all of Steps S1401-S1403 are not necessarily executed. Among Steps S1401-S1403, only Step S1401 can be executed.

Elements included in a web page are examples of display elements.

Also, the system configurations using the networks described in the embodiments are examples. Various system configurations can be provided depending on usages and/or purposes. The respective processes can be carried out in a distributing or dispersing manner, in a redundant manner, and/or in parallel, using two or more computers. Also, the information used by the information processing system 1 can be stored in two or more storage devices in a distributing or dispersing manner or in a redundant manner.

According to the embodiments, it is possible to convert an element of a web page based on a conversion rule.

Thus, the information processing apparatuses, the information processing methods and the information processing systems have been described in the embodiments. However, the present invention is not limited to a specific embodiment and variations and modifications may be made without departing from the scope of the present invention.

The present application is based on and claims the benefit of priority of Japanese Priority Application No. 2014-053940 dated Mar. 17, 2014, the entire contents of which are hereby incorporated herein by reference.

What is claimed is:

1. A multi-function printer (MFP) including at least one scanner, the MFP configured to display a web page received from an external source on a display device based on one or more display elements included in the web page, the MFP comprising:
   a memory having computer readable instructions stored thereon; and
   at least one processor configured to execute the computer readable instructions to,
      convert, according to a conversion rule, a display element included in the one or more display elements included in the web page, the converting including modifying the display element to include a display element for a user to use at least one information processing function of the MFP, wherein the display element to be modified does not include a display element for the user to use the at least one information processing function of the MFP, and
      display the web page on the display device, the web page including the converted display element, wherein
      when the web page received from the external source includes a first display element to display a select file button for the user to select a file,
      convert, according to the conversion rule, the first display element to a second display element to display, as the converted display element, a scan button for displaying at least a screen to select a scan setting and to start scanning.

2. The MFP as claimed in claim 1, wherein the at least one processor is further configured to:
   analyze each of the one or more display elements included in the web page to determine whether the display element is the converted display element based on a function of the MFP.

3. The MFP as claimed in claim 1, wherein the at least one processor is further configured to:
   receive a program to implement the converting of the display element from another MFP that stores the program, when the display element is determined as the converted display element.

4. The MFP as claimed in claim 1, wherein the at least one processor is further configured to:

receive a program to implement the converting of the display element from another MFP that stores the program, when the display element is determined as the converted display element.

5. The MFP as claimed in claim 2, wherein the at least one processor is further configured to:
receive a program to implement the converting of the display element from another MFP that stores the program, when the display element is determined as the converted display element.

6. The MFP as claimed in claim 1, wherein the at least one processor is further configured to:
determine whether a function of the MFP can be executed; and
convert the display element when determining that the function of the MFP can be executed.

7. The MFP as claimed in claim 2, wherein the at least one processor is further configured to:
determine whether a function of the MFP can be executed; and
convert the display element when determining that the function of the MFP can be executed.

8. The MFP as claimed in claim 3, wherein the at least one processor is further configured to:
determine whether a function of the MFP can be executed; and
convert the display element when determining that the function of the MFP can be executed.

9. The MFP as claimed in claim 4, wherein the at least one processor is further configured to:
determine whether a function of the MFP can be executed; and
convert the display element when determining that the function of the MFP can be executed.

10. The MFP as claimed in claim 5, wherein the at least one processor is further configured to:
determine whether a function of the MFP can be executed; and
convert the display element when determining that the function of the MFP can be executed.

11. An information processing method for displaying a web page received from an external source on a display device of a multi-function printer (MFP) based on one or more display elements included in the web page, the MFP including at least one scanner, the information processing method comprising:
converting, using at least one processor, according to a conversion rule, a display element included in the one or more display elements included in the web page, the converting including modifying the display element to include a display element for a user to use at least one information processing function of the MFP, wherein the display element to be modified does not include a display element for the user to use the at least one information processing function of the MFP; and
displaying, using the at least one processor, the web page on the display device, the web page including the converted display element, wherein
when the web page received from the external source includes a first display element to display a select file button for the user to select a file, the method further comprises,
converting, according to the conversion rule, the first display element to a second display element to display, as the converted display element, a scan button for displaying at least a screen to select a scan setting and to start scanning.

12. An image forming apparatus configured to display a web page received from an external source on a display device based on one or more display elements included in the web page, the image forming apparatus comprising:
at least one scanner;
a memory having computer readable instructions stored thereon; and
at least one processor configured to execute the computer readable instructions to,
convert, according to a conversion rule, a display element included in the one or more display elements included in the web page, the converting including modifying the display element to include a display element for a user to use at least one image forming function using the at least one scanner of the image forming apparatus, and
display the web page on the display device, the web page including the converted display element, wherein
when the web page received from the external source includes a first display element to display a select file button for the user to select a file, the at least one processor is further configured to convert, according to the conversion rule, the first display element to a second display element to display, as the converted display element, a scan button for displaying at least a screen to select a scan setting and to start scanning.

13. The image forming apparatus as claimed in claim 12, wherein
when the web page received from the external source includes a display element to be converted, the at least one processor is further configured to perform the converting the display element by:
generating a graphical user interface (GUI) for the user to input settings for the image forming function using at least the at least one scanner; and
displaying the GUI on the display device.

14. The image forming apparatus as claimed in claim 12, wherein
the first display element includes a form element or an input element, and the first display element does not include a display element for the user to use the at least one scanner of the image forming apparatus.

15. The MFP as claimed in claim 1, wherein the at least one information processing function is at least one of a print function, a scan function, and an address book function.

16. The information processing method as claimed in claim 11, wherein the at least one information processing function is at least one of a print function, a scan function, and an address book function.

17. The image forming apparatus as claimed in claim 12, wherein the at least one processor is further configured to:
generate an image file using the at least one scanner based on a scan start operation selected using the converted display element displayed on the display device; and
automatically select the generated image file using same file selection state settings as when a file is selected using the select file button.

* * * * *